(12) United States Patent
Hopkins et al.

(10) Patent No.: US 11,130,146 B2
(45) Date of Patent: Sep. 28, 2021

(54) FASTENER-COATING TOOLS

(71) Applicant: The Boeing Company, Chicago, IL (US)

(72) Inventors: Richard Lynn Hopkins, North Charleston, SC (US); Lyman Scott Ducworth, North Charleston, SC (US); Diana Dujunco Dan Larrabee, Mount Pleasant, SC (US); Janet Karen H. Jackson, North Charleston, SC (US); Sandra Loraine Boyd, Dorchester, SC (US); Elker I. Vasquez, Summerville, SC (US)

(73) Assignee: The Boeing Company, Chicago, IL (US)

( * ) Notice: Subject to any disclaimer, the term of this patent is extended or adjusted under 35 U.S.C. 154(b) by 82 days.

(21) Appl. No.: 16/418,674

(22) Filed: May 21, 2019

(65) Prior Publication Data

US 2020/0368772 A1 Nov. 26, 2020

(51) Int. Cl.
| | |
|---|---|
| *B05C 1/02* | (2006.01) |
| *B05C 17/00* | (2006.01) |
| *B05C 5/02* | (2006.01) |
| *B05C 1/06* | (2006.01) |
| *B05C 17/005* | (2006.01) |

(52) U.S. Cl.
CPC .................. *B05C 1/02* (2013.01); *B05C 1/06* (2013.01); *B05C 5/0208* (2013.01); *B05C 17/00* (2013.01); *B05C 17/002* (2013.01); *B05C 17/00503* (2013.01); *B05C 17/00516* (2013.01)

(58) Field of Classification Search
CPC ................................................ B05C 1/02–027
See application file for complete search history.

(56) References Cited

U.S. PATENT DOCUMENTS

| | | | | |
|---|---|---|---|---|
| 3,825,021 | A * | 7/1974 | Seidler ................. | A45D 40/262 401/75 |
| 5,743,359 | A * | 4/1998 | Parnell .................... | F16N 7/00 118/268 |
| 9,061,313 | B1* | 6/2015 | Williams .................. | B05C 1/02 |
| 9,180,480 | B1* | 11/2015 | Williams .................. | B05C 1/02 |
| 2017/0036233 | A1* | 2/2017 | Maslennikov ............ | B05C 1/06 |
| 2017/0105513 | A1* | 4/2017 | Davancens ............ | A46B 13/04 |
| 2017/0105514 | A1* | 4/2017 | Tomuta .................... | B05C 5/02 |
| 2018/0050364 | A1 | 2/2018 | Larrabee et al. | |
| 2020/0055075 | A1* | 2/2020 | Quddus .................... | B05C 1/02 |

* cited by examiner

*Primary Examiner* — Binu Thomas
(74) *Attorney, Agent, or Firm* — DASCENZO GATES Intellectual Property Law, P.C.

(57) ABSTRACT

Fastener-coating tools comprise a non-permeable body and a permeable body that laps over at least a portion of an outer surface of the non-permeable body, laps over all of a terminal surface of the non-permeable body, laps over at least a portion of an inner surface of the non-permeable body, spans an internal cavity of the non-permeable body, and defines a fastener cavity that is sized and shaped to receive a portion of a fastener assembly to be coated.

20 Claims, 10 Drawing Sheets

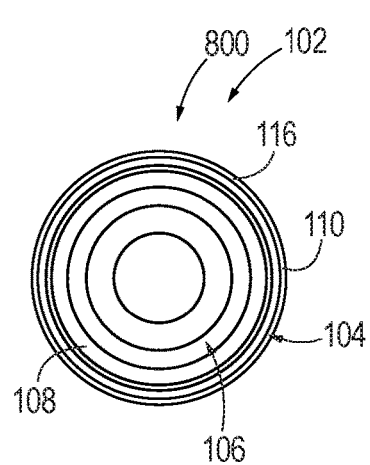 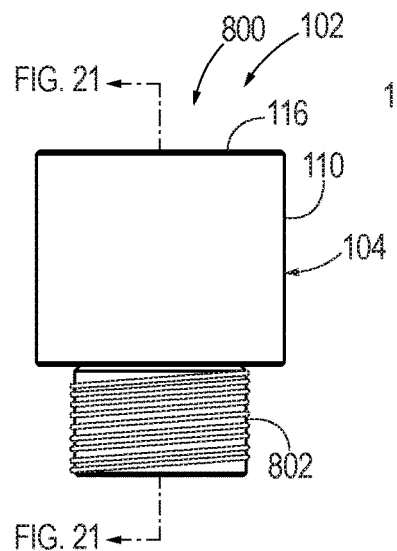 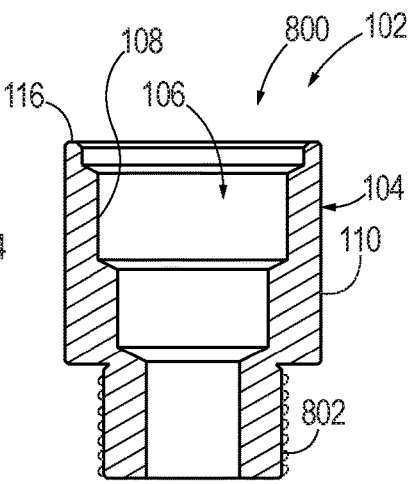
FIG. 19     FIG. 20     FIG. 21
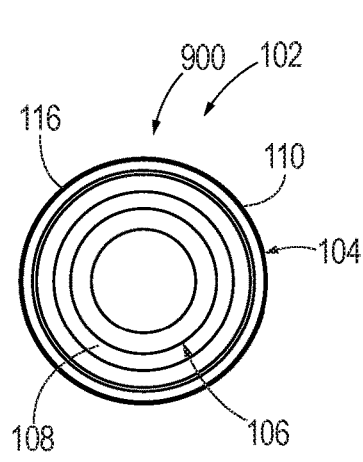 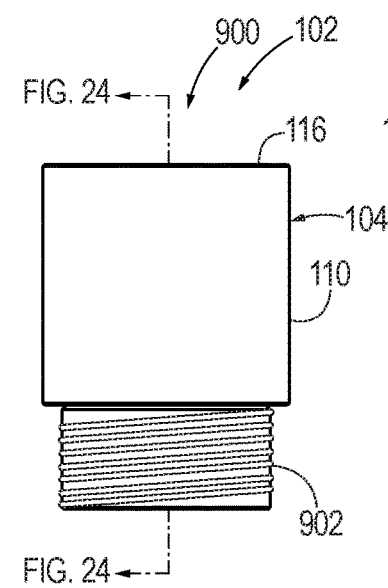 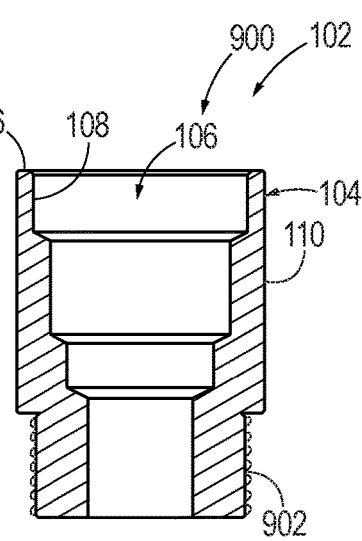
FIG. 22     FIG. 23     FIG. 24

FASTENER-COATING TOOLS

FIELD

The present disclosure relates to coating fasteners, such as with primer, paint, or other liquid.

BACKGROUND

Various fasteners are used throughout manufacturing industries, including in the manufacture of aerospace vehicles, land vehicles, marine vehicles, space vehicles, machinery, etc. In some applications, installed fasteners may require coating with a primer before the overall assembly is painted. In some applications, specifications require full coverage of the exposed fastener with primer and application of the primer within a precise ring around the fastener on the substrate from which the fastener extends. Conventionally, primer is applied manually to fasteners by utilizing foam or bristle brushes. However, manual techniques often result in application of too much or too little primer, resulting in time-consuming (and thus costly) rework.

SUMMARY

Fastener-coating tools, kits thereof, and related methods are disclosed.

Disclosed herein are fastener-coating tools that comprise a non-permeable body and a permeable body. The non-permeable body comprises a non-permeable wall, having a closed shape. The non-permeable wall comprises an inner surface, an outer surface, and a terminal surface. The inner surface defines an internal cavity in the non-permeable body. The outer surface faces away from the internal cavity of the non-permeable body. The terminal surface has a closed shape and interconnects the inner surface and the outer surface of the non-permeable wall. The permeable body laps over at least a portion of the outer surface of the non-permeable wall, laps over all of the terminal surface of the non-permeable wall, laps over at least a portion of the inner surface of the non-permeable wall, spans the internal cavity of the non-permeable body, and defines a fastener cavity. The fastener cavity extends at least partially within the internal cavity of the non-permeable body and is sized and shaped to receive a portion of a fastener assembly to be coated. The fastener cavity has an open end, proximate to the terminal surface of the non-permeable wall, and a closed end within the internal cavity of the non-permeable body and opposite the open end.

Also disclosed herein are kits that comprise two or more fastener-coating tools according to the present disclosure.

Additionally disclosed herein are methods of coating a fastener assembly that extends from a substrate, comprising steps of at least partially saturating a permeable body with a volume of a liquid, and covering the fastener assembly with the permeable body. The step of covering the fastener assembly comprises steps of at least partially compressing the permeable body against the fastener assembly, and transferring a portion of the volume of the liquid from the permeable body to an exposed outer surface of the fastener assembly and to a ring on the substrate, surrounding the fastener assembly.

BRIEF DESCRIPTION OF THE DRAWINGS

FIG. 19 is an end view of an example non-permeable body of an example fastener-coating tool according to the present disclosure.

FIG. 20 is a side view of the non-permeable body of FIG. 19.

FIG. 21 is a cross-sectional view of the non-permeable body of FIG. 19, taken along line 21-21 in FIG. 20.

FIG. 22 is an end view of an example non-permeable body of an example fastener-coating tool according to the present disclosure.

FIG. 23 is a side view of the non-permeable body of FIG. 22.

FIG. 24 is a cross-sectional view of the non-permeable body of FIG. 22, taken along line 24-24 in FIG. 23.

DESCRIPTION

Figure 1:
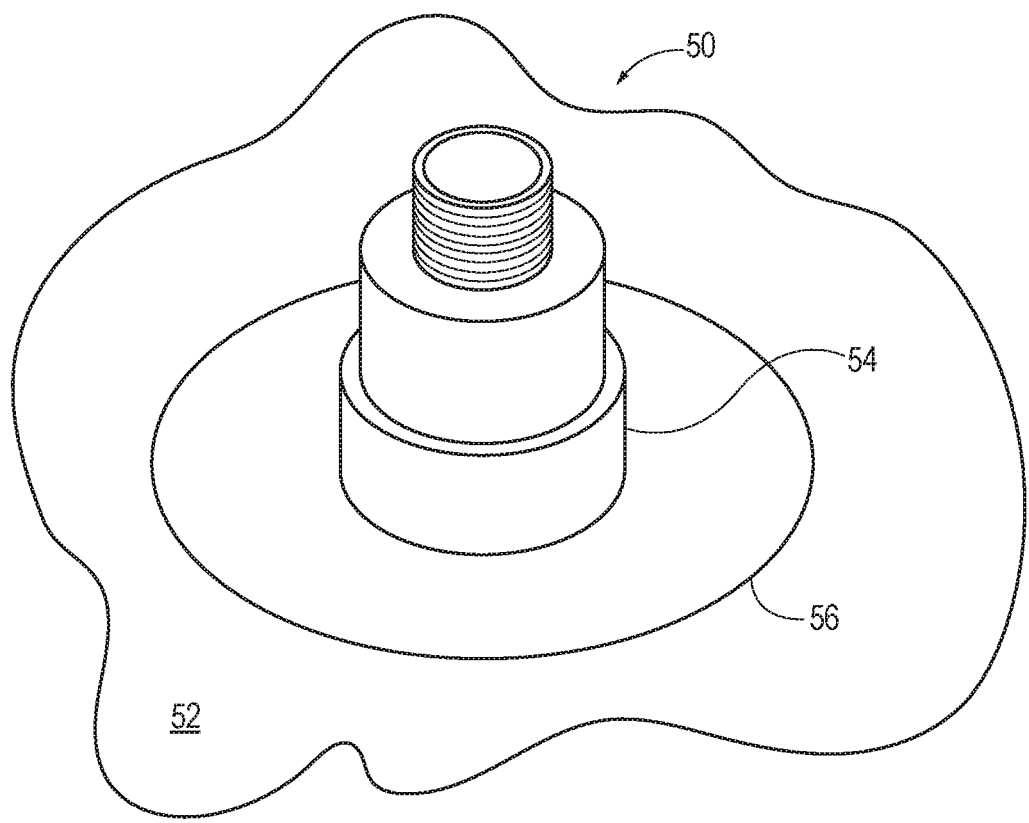
FIG. 1 is a perspective view an example fastener assembly extending from a substrate and coated with a liquid, as applied by a fastener-coating tool according to the present disclosure or as a result of a method according to the present disclosure.

Fastener-coating tools, kits thereof, and related methods of coating fastener assemblies are disclosed herein. In particular, with reference to FIG. 1, fastener-coating tools and kits may be used and methods may be implemented to coat outer surface 54 of fastener assembly 50 and ring 56 around fastener assembly 50 on substrate 52, from which fastener assembly 50 extends, with a primer, a paint, or other liquid. Examples of fastener assemblies include those used in the aerospace, automotive, marine vehicle, and space vehicle manufacturing industries, such as (but not limited to) lockbolt assemblies, bolt-and-nut assemblies, rivets, etc.

FIGS. 2-7 schematically illustrate various examples of fastener-coating tools. Generally, in these figures, elements that are likely to be included in a given example are illustrated in solid lines, while elements that may be optional to a given example are illustrated in broken lines. However, elements that are illustrated in solid lines are not essential to all examples of the present disclosure, and an element shown in solid lines may be omitted from a particular example without departing from the scope of the present disclosure. Moreover, elements shown in broken lines may be important in some examples.

As schematically represented in FIGS. 2-7, fastener-coating tool 100 comprises at least non-permeable body 102 and permeable body 112. By "non-permeable," it is meant that the material, from which non-permeable body 102 is constructed, generally does not permit liquid 122 to pass therethrough. In some examples, non-permeable body 102 also may be described as a rigid body that supports permeable body 112. In one or more examples, non-permeable body 102 is constructed of a plastic or a metal having sufficient rigidity to support permeable body 112 for operative compression of permeable body 112 between non-permeable body 102 and fastener assembly 50 and adjacent substrate 52. By "permeable," it is meant that the material, from which permeable body 112 is constructed, permits liquid 122 to pass therethrough. In particular, permeable body 112 is configured to absorb and wick liquid 122 for application to fastener assembly 50 and adjacent substrate 52. In some examples, permeable body 112 also may be described as being resilient, or as being constructed of a resilient material, such that following being compressed between non-permeable body 102 and fastener assembly 50 and adjacent substrate 52, permeable body 112 returns, or relaxes, to a default state. In some examples, all portions of permeable body 112 are fluidically permeable. In one or more examples, permeable body 112 is constructed, or composed, of reticulated foam material 128, which additionally or alternatively may be described as an open-cell foam material, a specific example of which is a reticulated polyurethane foam having about 50-100 pores per inch (127-254 pores per centimeter). However, other configurations of material may be used to construct permeable body 112, such as based on the material properties of liquid 122 being applied by fastener-coating tool 100. By being constructed of reticulated foam material 128, liquid 122 is able to wick, or otherwise migrate, throughout permeable body 112 for application to fastener assembly 50 and adjacent substrate 52, as discussed herein.

Non-permeable body 102 comprises non-permeable wall 104 that has a closed shape and that comprises inner surface 108 that defines internal cavity 106 in non-permeable body 102, outer surface 110 that faces away from internal cavity 106, and terminal surface 116, having a closed shape and that interconnects inner surface 108 and outer surface 110. By having a "closed shape," it is meant that non-permeable wall 104 and terminal surface 116 will fully encircle fastener assembly 50 when at least partially received within internal cavity 106. That said, non-permeable wall 104 may comprise inlet 144 to internal cavity 106, as discussed herein, and still be considered to have a closed shape.

As schematically illustrated in FIGS. 2-7, permeable body 112 laps over at least a portion of outer surface 110 of non-permeable wall 104, laps over an entirety of terminal surface 116 of non-permeable wall 104, laps over at least a portion of inner surface 108 of non-permeable wall 104, and spans internal cavity 106 of non-permeable body 102. In addition, permeable body 112 defines fastener cavity 114 that extends at least partially within internal cavity 106 of non-permeable body 102, with fastener cavity 114 being sized and shaped to receive a portion of a fastener assembly 50 to be coated with liquid 122. That is, fastener cavity 114 has open end 118, proximate to terminal surface 116 of non-permeable wall 104 for receiving fastener assembly 50 into fastener cavity 114, and closed end 119, within internal cavity 106 of non-permeable body 102 and opposite open end 118. Accordingly, when fastener assembly 50 that extends from substrate 52 is received within fastener cavity 114 via open end 118, the portion of permeable body 112 that laps over terminal surface 116 of non-permeable wall 104 of non-permeable body 102 will engage substrate 52 for application of ring 56 of liquid 122 thereto. In addition, the portion of permeable body 112 that laps over inner surface 108 of non-permeable wall 104 of non-permeable body 102 will engage the lateral sides of fastener assembly 50 for application of liquid 122 thereto, and the portion of permeable body 112 that spans internal cavity 106 of non-permeable body 102 and that defines closed end 119 of fastener cavity 114 will engage the terminal end of fastener assembly 50 for application of liquid 122 thereto.

By being sized and shaped to receive a portion of a particular fastener assembly, it is meant that fastener cavity 114, defined by permeable body 112, is generally in the shape of the portion of a particular fastener assembly, extending from substrate 52. In one or more examples, prior to fastener assembly 50 being received within fastener cavity 114, the fastener cavity is slightly smaller than fastener assembly 50. As a result, when fastener assembly 50 is received within fastener cavity 114, permeable body 112 compresses and transfers liquid 122 from permeable body 112 to fastener assembly 50. Moreover, non-permeable wall 104 of non-permeable body 102 provides support for permeable body 112, such that permeable body 112 is compressed between non-permeable wall 104 and fastener assembly 50 when fastener assembly 50 is received within fastener cavity 114. In addition, when fastener-coating tool 100 is urged against substrate 52, permeable body 112 is compressed between substrate 52 and terminal surface 116 of non-permeable wall 104 of non-permeable body 102, and liquid 122 will thereby transfer from permeable body 112 to substrate 52 to create ring 56 of liquid 122 around fastener assembly 50.

As schematically and optionally represented in FIGS. 2-7, some fastener-coating tools 100 further comprise liquid source 120 that is configured to deliver liquid 122 from liquid source 120 to internal cavity 106 of non-permeable body 102. In one or more such examples, liquid source 120 comprises reservoir 124 that is configured to hold a volume of liquid 122. Accordingly, a supply of liquid 122 is readily available for application to one or more fastener assemblies 50. A suitable volume may be selected based on specific applications. For example, in some applications, it may be desirable to have a large enough volume to operatively coat several fastener assemblies, such as at a work station in a manufacturing environment. In some applications, it may be desirable to have a volume of liquid 122 that corresponds to a single application of liquid 122 to a single fastener assembly, for example, so that liquid 122 may be dispensed without a user of fastener-coating tool 100 needing to control the volume of liquid 122 that is dispensed. It also may be desirable to have a volume that is sufficiently small so as to keep the overall weight of fastener-coating tool 100 below a threshold, such as to avoid user fatigue during use of fastener-coating tool 100. In some examples, reservoir 124 may be integral, or otherwise rigidly coupled to, non-permeable body 102 of fastener-coating tool 100, such that fastener-coating tool 100, as a whole, is handheld. In other examples, reservoir 124 may be remote from non-permeable body 102, such as with a tube, or hose, connecting reservoir 124 to internal cavity 106 of non-permeable body 102. In such examples, reservoir 124 of a larger size may be provided, thereby increasing the time required for replacing or refilling reservoir 124 with a volume of liquid 122. Fastener-coating tools 100 may be configured for use with, and reservoirs 124 may be configured for holding, various types of liquid 122, depending on the application of a particular fastener-coating tool. As noted, examples of liquid 122 include primers and paints. In some examples, fastener-coating tools 100 may be specifically configured and well-suited for liquids that have a viscosity of less than 100 centistokes.

With continued reference to FIGS. 2-7, in one or more examples, liquid source 120 comprises user-input mechanism 126 that is configured to selectively dispense a predetermined volume of liquid 122 from liquid source 120 to internal cavity 106 of non-permeable body 102. That is, user-input mechanism 126 is configured to receive input from a user, such as by direct engagement thereof, for selective dispensing of liquid 122 to internal cavity 106. Accordingly, when a user operatively engages user-input mechanism 126, a known quantity of liquid 122 will be dispensed to internal cavity 106 and thus ultimately to permeable body 112 for application to fastener assembly 50. Non-exclusive examples of user-input mechanisms 126 include (but are not limited to) buttons, triggers, levers, plungers, etc.

Figure 2:
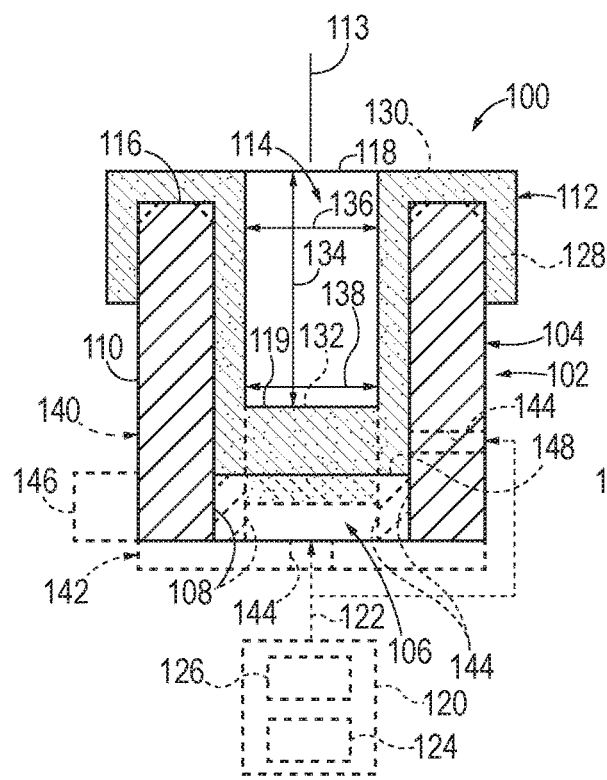
FIG. 2 is a schematic cross-sectional, side-view diagram representing examples of fastener-coating tools according to the present disclosure.
Figure 3:
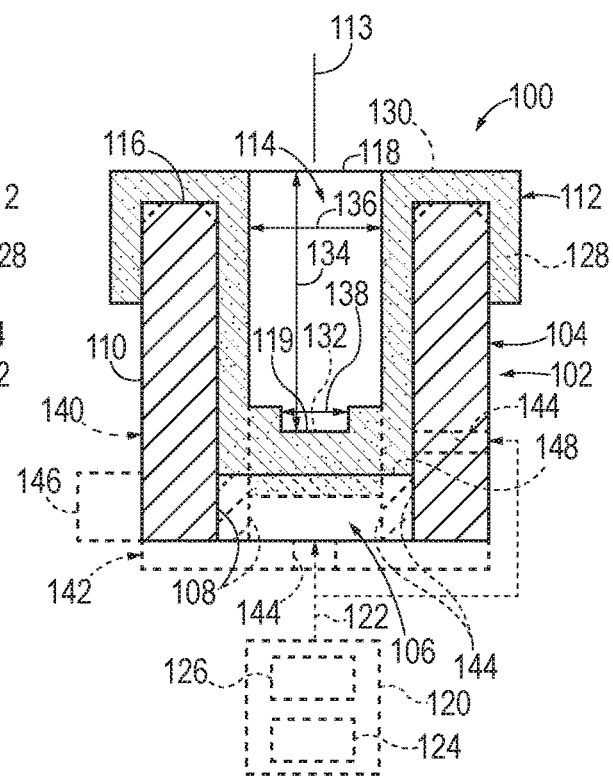
FIG. 3 is a schematic cross-sectional, side-view diagram representing examples of fastener-coating tools according to the present disclosure.
Figure 4:
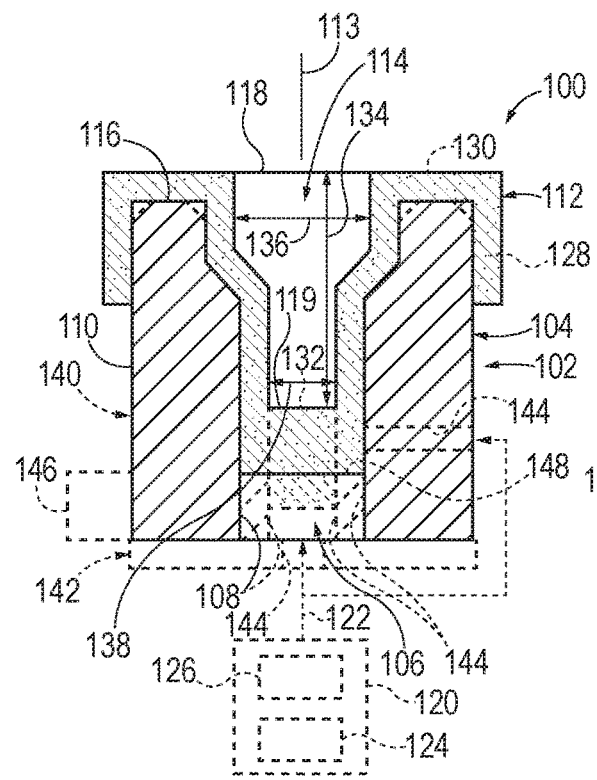
FIG. 4 is a schematic cross-sectional, side-view diagram representing additional examples of fastener-coating tools according to the present disclosure.

As schematically represented in solid lines in FIGS. 2-4, in some examples, permeable body 112 consists of a single part. Such a configuration of permeable body 112 facilitates ease of assembly with non-permeable body 102. However, as schematically and optionally represented in dashed lines in FIGS. 2-4 and as schematically represented in solid lines in FIGS. 5-7, in other examples, permeable body 112 comprises a plurality of separate parts. In some such examples, such a configuration facilitates the manufacturing of permeable body 112. For example, with reference to the schematic and optional (dashed) examples of FIGS. 2-4, permeable body 112 having two pieces may be constructed from a cylindrical stock of foam, whose core is removed, resulting in a hollow cylinder and a solid core. The hollow cylinder is then assembled with non-permeable body 102, followed by insertion of at least a portion of the solid core to span internal cavity 106 of non-permeable body 102 and define closed end 119 of fastener cavity 114. In other examples, such as the schematic representations of FIGS. 5-7, utilizing more than one permeable body part enables the creation of unique and desired profiles of fastener cavity 114, such as to correspond in shape and size to a specific fastener assembly, as well as to optimize a thickness of permeable body 112 across regions thereof for absorption and carrying of liquid 122.

In one or more examples, as schematically represented in FIGS. 2-7, permeable body 112 has central axis 113 and comprises first permeable-body part 130 and second permeable-body part 132 that is in contact with first permeable-body part 130. In some such examples, as in FIGS. 2-5 and 7, first permeable-body part 130 defines open end 118 of fastener cavity 114, and second permeable-body part 132 defines closed end 119 of fastener cavity 114. Such a configuration facilitates the ability to create a stepped profile of fastener cavity 114 to correspond to an outer shape of a particular fastener assembly. In other such examples, as in FIG. 6, second permeable-body part 132 defines both closed end 119 and open end 118 of fastener cavity 114. This latter example avoids seams between the two body parts within fastener cavity 114, which otherwise could affect a uniform application of liquid 122 to fastener assembly 50 such as by getting caught, or snagged, on an edge of fastener assembly 50.

Figure 5:
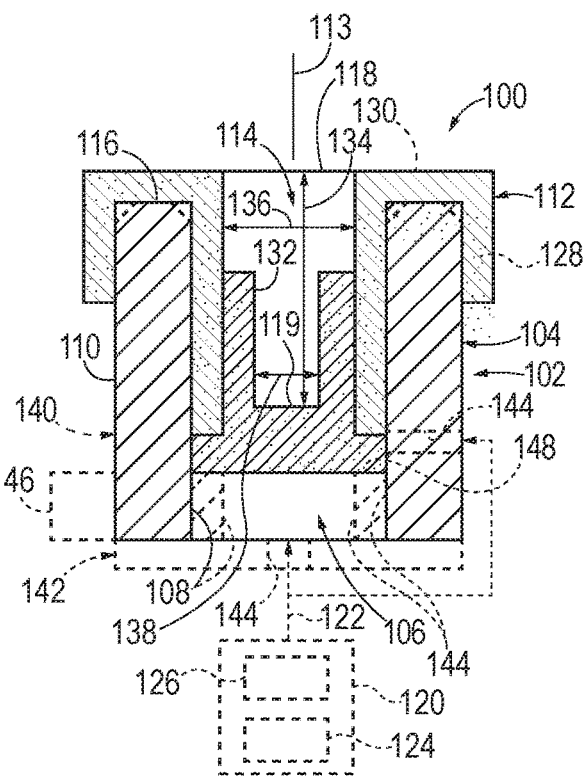
FIG. 5 is a schematic cross-sectional, side-view diagram representing additional examples of fastener-coating tools according to the present disclosure.
Figure 6:
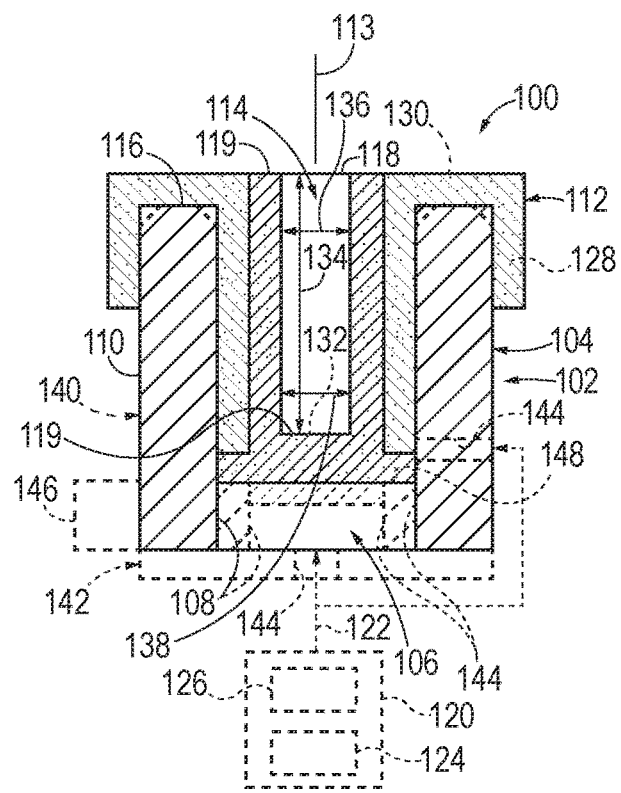
FIG. 6 is a schematic cross-sectional, side-view diagram representing additional examples of fastener-coating tools according to the present disclosure.
Figure 7:
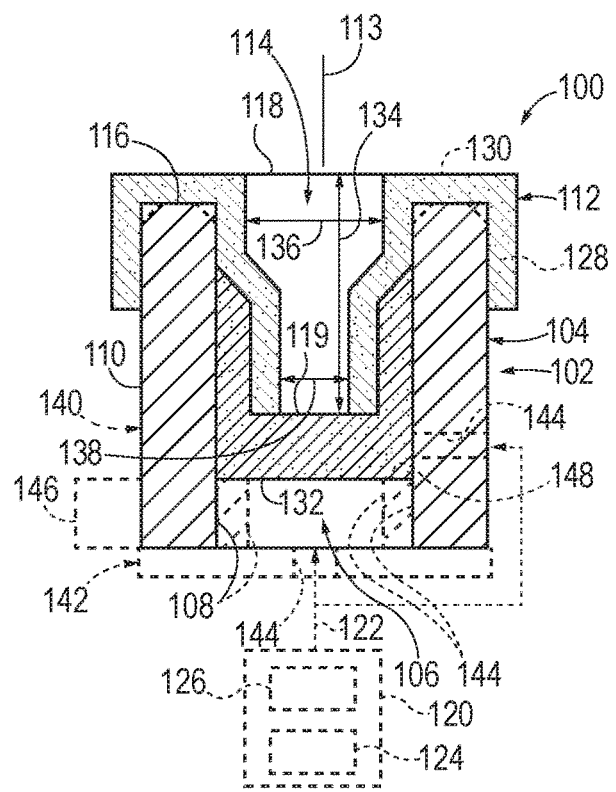
FIG. 7 is a schematic cross-sectional, side-view diagram representing additional examples of fastener-coating tools according to the present disclosure.

In some examples, first permeable-body part 130 at least partially laps over second permeable-body part 132 in a direction that is parallel to central axis 113, such as optionally illustrated in dashed lines in FIGS. 2-4 and as illustrated in solid lines in FIGS. 5-7. Additionally or alternatively, in some examples, as illustrated in FIGS. 5-7, first permeable-body part 130 at least partially laps over second permeable-body part 132 in a direction that is transverse to central axis 113. Such configurations ensure adequate contact between the two body parts for operative wicking of liquid 122 throughout permeable body 112.

In one or more examples, first permeable-body part 130 circumscribes second permeable-body part 132 and does not lap over any portion of second permeable-body part 132 when viewed along central axis 113, such as optionally illustrated in dashed lines in FIGS. 2-4. In some such examples, central axis 113 intersects second permeable-body part 132 and does not intersect first permeable-body part 130. Such a configuration facilitates ease of manufacturing and assembly, such as from a cylindrical stock of foam as discussed above.

In one or more examples, second permeable-body part 132 laps over first permeable-body part 130 when viewed along central axis 113, such as in the examples of FIGS. 5-7. Such a configuration may ensure adequate contact between the two body parts for operative wicking of liquid 122 throughout permeable body 112. In some such examples, central axis 113 intersects second permeable-body part 132 and does not intersect first permeable-body part 130.

In one or more examples, first permeable-body part 130 laps over at least a portion of outer surface 110 of non-permeable wall 104, laps over all of terminal surface 116 of non-permeable wall 104, and laps over at least a portion of inner surface 108 of non-permeable wall 104. By having first permeable-body part 130 wrap-around from outer surface 110 to inner surface 108, first permeable-body part 130 is retained on non-permeable wall 104 by the resilience of the material from which permeable body 112 is constructed. Moreover, by having first permeable-body part 130 extend along all three of outer surface 110, terminal surface 116, and inner surface 108, the integrity of permeable body 112 is maintained when fastener assembly 50 is received within and removed from fastener cavity 114.

With continued reference to FIGS. 2-7, fastener cavity 114 may be described as having depth dimension 134, first lateral dimension 136 at open end 118 of fastener cavity 114, and second lateral dimension 138 at closed end 119 of fastener cavity 114. First lateral dimension 136 and second lateral dimension 138 are measured along an axis that is perpendicular to an axis along which depth dimension 134 is measured. In some examples, as represented in FIGS. 3-5 and 7, first lateral dimension 136 is greater than second lateral dimension 138. Accordingly, fastener cavity 114 is shaped to correspond to fastener assembly 50 whose terminal end is narrower than its base where it extends from substrate 52, such as in the example of FIG. 1. In the examples optionally represented in FIGS. 3 and 5, in which permeable body 112 comprises two permeable-body parts, first permeable-body part 130 defines first lateral dimension 136 and second permeable-body part 132 defines second lateral dimension 138. In other examples, such as optionally represented in FIGS. 2, 4, and 7, first permeable-body part 130 defines both first lateral dimension 136 and second lateral dimension 138.

In one or more examples, as schematically represented in FIG. 4, internal cavity 106 of non-permeable body 102 is wider proximate to open end 118 of fastener cavity 114 than proximate to closed end 119 of fastener cavity 114. Accordingly, in such examples, non-permeable body 102 may be shaped to correspond to the outer contours of fastener assembly 50, taking into account a thickness of the portion of permeable body 112 that laps over inner surface 108 of non-permeable wall 104 of non-permeable body 102. As a result, permeable body 112 simply conforms to the shape of internal cavity 106, resulting in fastener cavity 114 that also is shaped to correspond to the outer contours of fastener assembly 50. Accordingly, when fastener assembly 50 is received within fastener cavity 114, inner surface 108 and fastener assembly 50 collectively compress permeable body 112, resulting in application of liquid 122 held within permeable body 112 to fastener assembly 50.

In some examples, non-permeable body 102 consists of a single part. In other examples, as optionally represented in FIGS. 2-7, non-permeable body 102 comprises more than one part. For example, non-permeable body 102 may comprise first non-permeable-body part 140 and second non-permeable-body part 142 that is coupled to first non-permeable-body part 140, and in which first non-permeable-body part 140 comprises inner surface 108, outer surface 110, and terminal surface 116. In some such examples, second non-permeable-body part 142 comprises inlet 144 to internal cavity 106 of non-permeable body 102 for receipt of liquid 122 from liquid source 120. Such examples may be described as having two-part non-permeable bodies and may facilitate the construction of fastener-coating tools 100, such as to facilitate machining of internal cavity 106. Additionally or alternatively, such two-part non-permeable bodies may facilitate operative coupling to handle 146, such as with handle 146 being positioned and engaged between first non-permeable-body part 140 and second non-permeable-body part 142. In one or more examples, second non-permeable-body part 142 is releasably coupled to first non-permeable-body part 140, such as by a threaded or other releasable connection.

In some examples, second non-permeable-body part 142 comprises inlet 144 to internal cavity 106 of non-permeable body 102 for receipt of liquid 122 from liquid source 120. In other examples, as optionally and schematically represented in FIGS. 2-7, first non-permeable-body part 140 comprises inlet 144. In some examples, inlet 144 is longitudinally aligned with internal cavity 106, while in other examples, inlet 144 is transverse to a longitudinal axis of internal cavity 106. Non-permeable body 102 therefore may be constructed in a variety of ways to facilitate manufacturing of the component parts, to address ergonomic factors based on the ultimate use (e.g., location and space constraints associated with the ultimate application) of fastener-coating tool 100.

As schematically and optionally represented in dashed lines in FIGS. 2-7, in one or more examples, fastener-coating tools 100 further comprise handle 146, coupled non-permeable body 102 and shaped to be grasped by a user for selective placement of fastener cavity 114 over fastener assembly 50. Various configurations of handles may be provided depending on the ultimate use (e.g., location and space constraints associated with the ultimate application) of fastener-coating tool 100. In some examples, handle 146 is longitudinally aligned with fastener cavity 114, such as to permit a user to reach and coat fastener assembly 50 that is extending in a direction, generally toward the user. In other examples, handle 146 extends transverse to fastener cavity 114, such as to permit a user to reach and coat fastener assembly 50 that is extending in a direction, generally transverse to the user. Other configurations of handles 146 also may be incorporated into fastener-coating tool 100.

In some examples, handle 146 is coupled to and extends between two non-permeable bodies, such that a user may coat two spaced-apart fastener assemblies, either simultaneously or sequentially depending on the spacing of fastener assemblies 50. In some such examples, the two non-permeable bodies have the same size and shape of fastener cavity, such as to facilitate coating of two similarly configured fastener assemblies. In other examples, however, the two non-permeable bodies have different sizes and/or shapes of fastener cavity, such as to facilitate coating of two differently configured fastener assemblies.

With continued reference to FIGS. 2-7, and as optionally and schematically represented in dashed lines, in one or more examples of fastener-coating tools 100, the transitions between inner surface 108, terminal surface 116, and outer surface 110 of non-permeable wall 104 have no angles that are less than 90°. Such a configuration avoids sharp edges that may damage or otherwise prematurely wear permeable body 112.

As schematically and optionally represented in dashed lines in FIGS. 2-7, in one or more examples, non-permeable wall 104 of non-permeable body 102 defines shelf 148 that is positioned to engage permeable body 112. In such examples, shelf 148 provides structure against which permeable body 112 is positioned. Accordingly, shelf 148 facilitates assembly of permeable body 112 and non-permeable body 102 so that permeable body 112 is appropriately positioned within internal cavity 106 and with sufficient length to operatively wrap around terminal surface 116.

Figure 8:
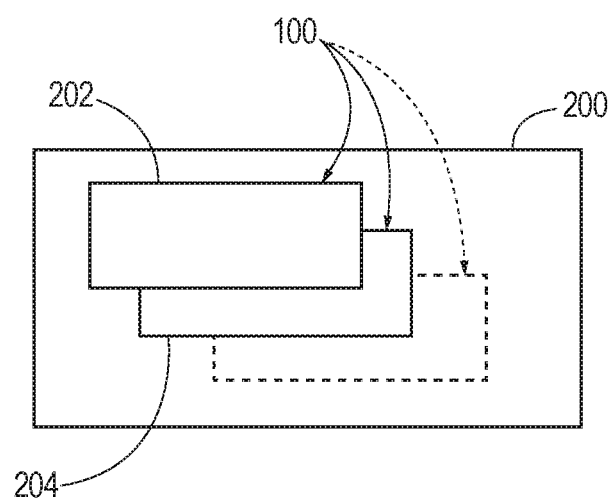
FIG. 8 is a schematic diagram representing kits according to the present disclosure.

Turning now to FIG. 8, also within the scope of the present disclosure are kits 200 that comprise two or more of fastener-coating tools 100 according to the present disclosure. In some examples, the fastener cavity of first fastener-coating tool 202 has a different size and/or shape than the fastener cavity of second fastener-coating tool 204. Accordingly, a plurality of fastener-coating tools 100 may be provided, such as at a work station of a manufacturing facility, with different fastener-coating tools being configured to coat different configurations of fastener assemblies 50.

Turning now to FIGS. 9-26, illustrative non-exclusive examples of fastener-coating tools 100, component parts thereof, and kit 200 are illustrated. Where appropriate, the reference numerals from the schematic illustrations of FIGS. 2-8 are used to designate corresponding parts of the examples of FIGS. 9-26; however, the examples of FIGS. 9-26 are non-exclusive and do not limit fastener-coating tools 100 and kits 200 to the illustrated examples of FIGS. 9-26. That is, fastener-coating tools 100 and kits 200 are not limited to the specific examples, illustrated in FIGS. 9-26, and fastener-coating tools 100 and kits 200 may incorporate any number of the various aspects, configurations, characteristics, properties, etc. of fastener-coating tools 100 and kits 200 that are illustrated in and discussed with reference to the schematic representations of FIGS. 2-8 and/or the more specific examples of FIGS. 9-26, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 9-26; however, it is within the scope of the present disclosure that the previously discussed features, variants, etc. may be utilized with the provided examples.

Figure 9:
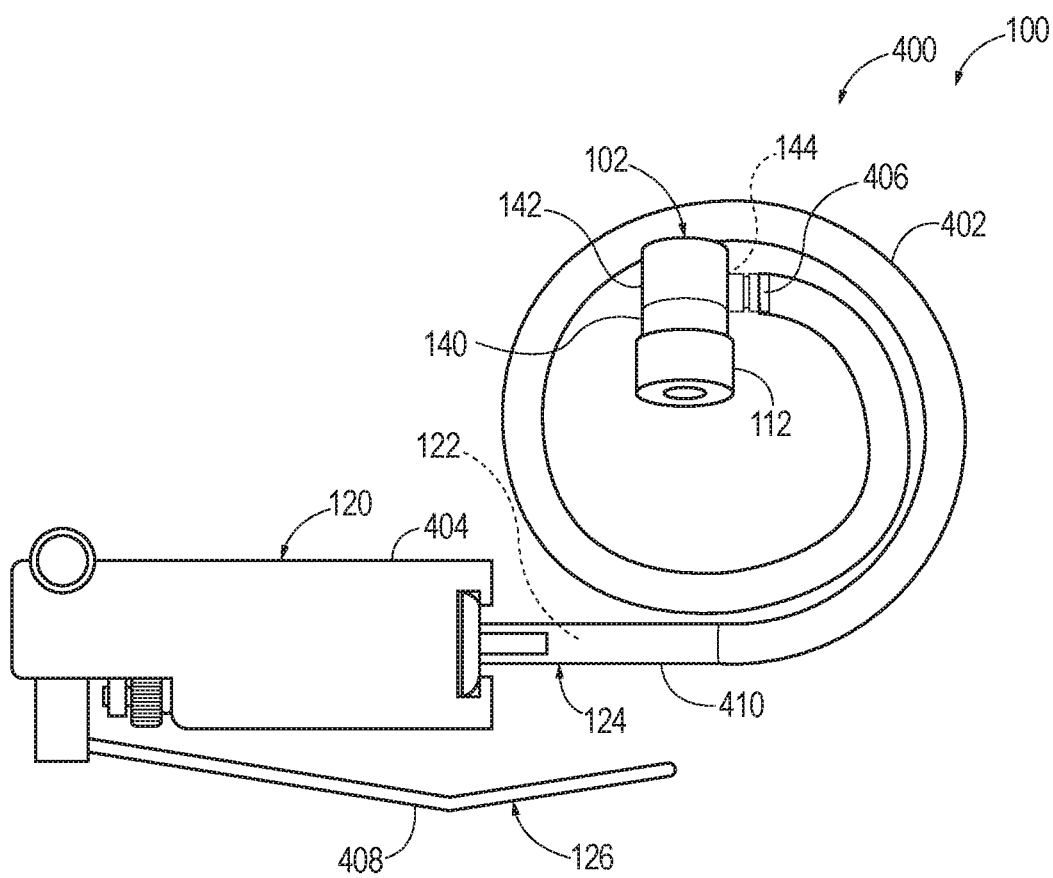
FIG. 9 depicts an example fastener-coating tool according to the present disclosure.

FIG. 9 depicts an example fastener-coating tool, designated as fastener-coating tool 400, that comprises liquid source 120 in the form of manual syringe dispenser 404, having user-input mechanism 126 in the form of lever 408 and reservoir 124 in the form of syringe 410. Fastener-coating tool 400 further comprises hose 402 that interconnects syringe 410 with non-permeable body 102. Fastener-coating tool 400 comprises non-permeable body 102 having two parts, with second non-permeable-body part 142 defining inlet 144 that is transverse to the longitudinal axis of the non-permeable body's internal cavity, and hose fitting 406 coupled to inlet 144. Manual syringe dispenser 404 provides for precise application of a known volume of liquid 122 from syringe 410 and ease of use by a user. Examples of suitable manual syringe dispensers include those sold under the MICRO-DOT™ brand by DYMAX™ Corporation. Other suitable examples of liquid sources 120 include portable fluid dispensers sold by NORDSON™ Corporation.

Figure 10:
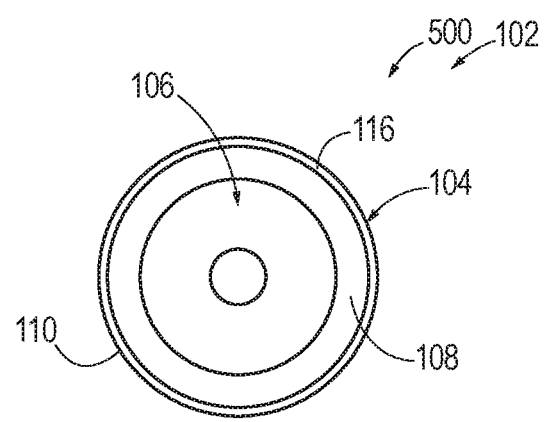
FIG. 10 is an end view of an example non-permeable body of an example fastener-coating tool according to the present disclosure.
Figures 11, 12:
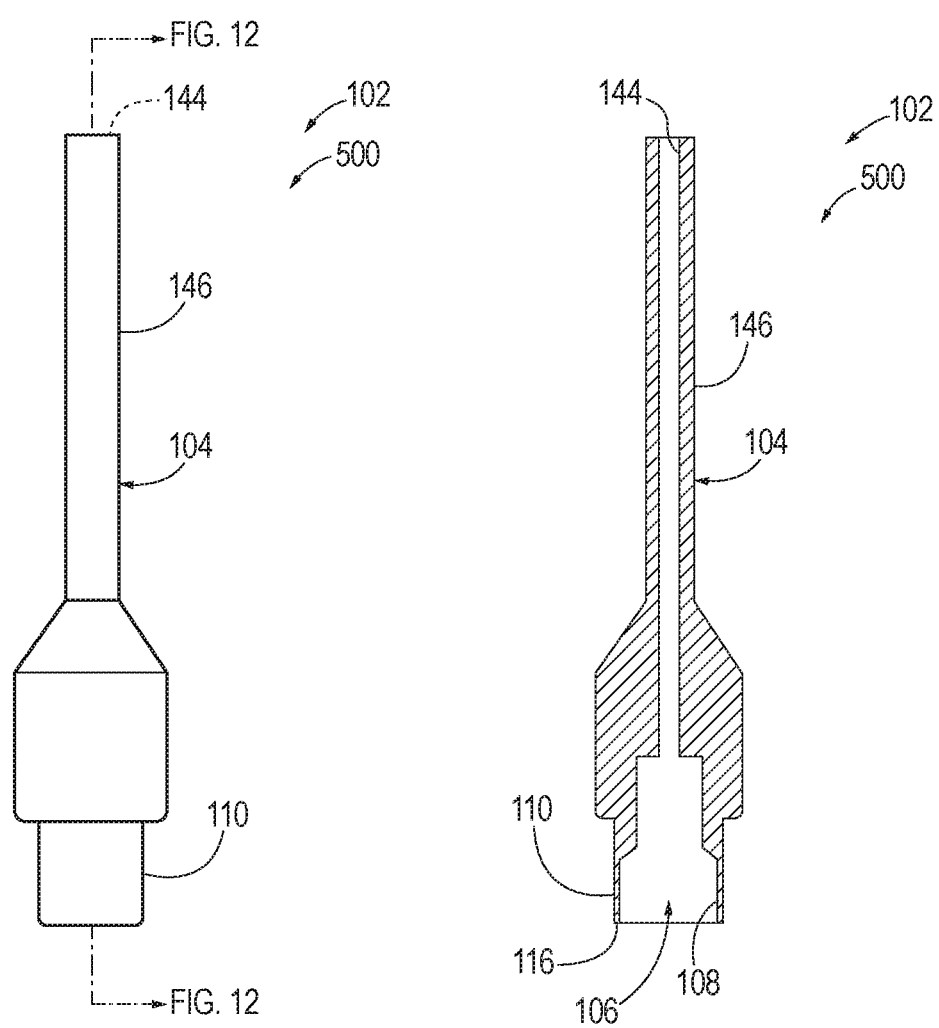
FIG. 11 is a side view of the non-permeable body of FIG. 10.
FIG. 12 is a cross-sectional view of the non-permeable body of FIG. 10, taken along line 12-12 in FIG. 11.

FIGS. 10-12 depict an example non-permeable body, designated as non-permeable body 500. Non-permeable body 500 comprises an integral elongate handle that is longitudinally aligned with internal cavity 106. Moreover, non-permeable body 500 is an example of non-permeable body 102 whose internal cavity 106 is shaped to correspond to the shape of a particular fastener assembly. Handle 146 of non-permeable body 500 defines inlet 144 for liquid to be dispensed to internal cavity 106, and handle 146 is shaped to be inserted into associated tubing for operative coupling to liquid source 120.

Figure 13:
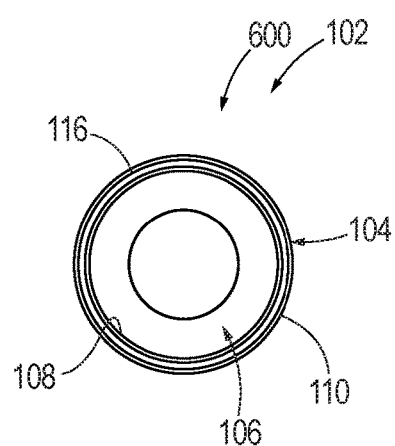
FIG. 13 is an end view of an example non-permeable body of an example fastener-coating tool according to the present disclosure.
Figure 14:
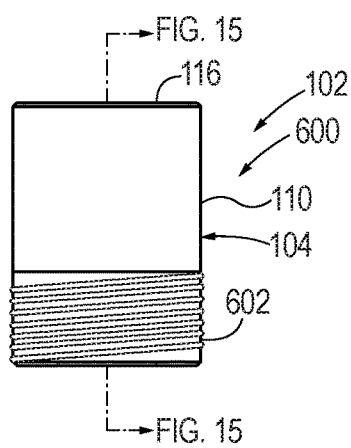
FIG. 14 is a side view of the non-permeable body of FIG. 13.
Figure 15:
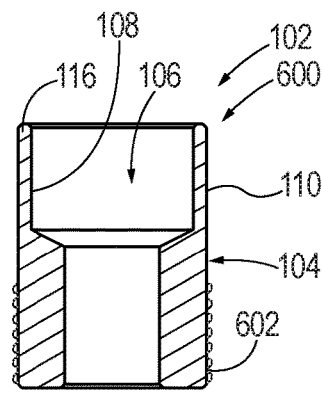
FIG. 15 is a cross-sectional view of the non-permeable body of FIG. 13, taken along line 15-15 in FIG. 14.

FIGS. 13-15 depict another example of non-permeable body 102, designated as non-permeable body 600. Non-permeable body 600 also is an example of non-permeable body 102 whose internal cavity 106 is shaped to correspond to the shape of a particular fastener assembly. Non-permeable body 600 comprises external threads 602 for selective coupling with an upstream component of fastener-coating tool 100, such as second non-permeable-body part 142 or other structure configured to facilitate delivery of liquid 122 to internal cavity 106 of non-permeable body 600. Non-permeable body 600 also is an example of non-permeable body 102, whose terminal surface 116 is chamfered such that the transitions between outer surface 110, terminal surface 116, and inner surface 108 have angles that are greater than 90°.

Figure 16:
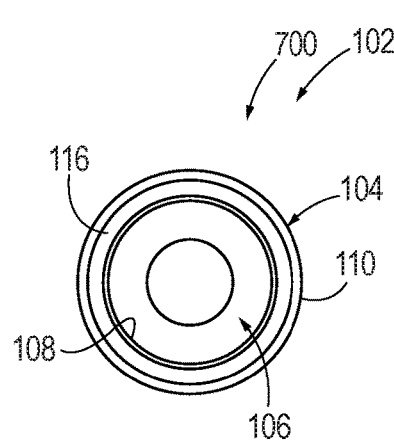
FIG. 16 is an end view of an example non-permeable body of an example fastener-coating tool according to the present disclosure.
Figure 17:
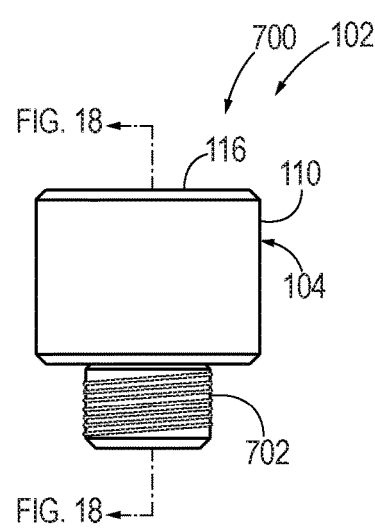
FIG. 17 is a side view of the non-permeable body of FIG. 16.
Figure 18:
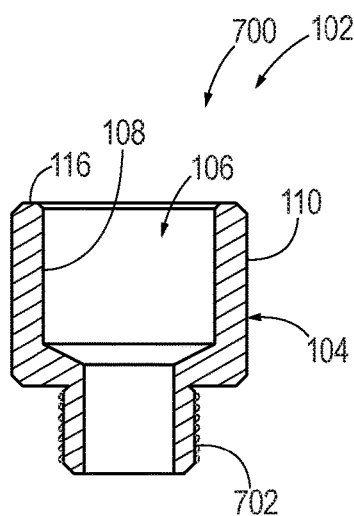
FIG. 18 is a cross-sectional view of the non-permeable body of FIG. 16, taken along line 18-18 in FIG. 17.

FIGS. 16-18 depict another example of non-permeable body 102, designated as non-permeable body 700. Non-permeable body 700 also is an example of non-permeable body 102 whose internal cavity 106 is shaped to correspond to the shape of a particular fastener assembly. Non-permeable body 700 comprises external threads 702 for selective coupling with an upstream component of fastener-coating tool 100, such as second non-permeable-body part 142 or other structure configured to facilitate delivery of liquid 122 to internal cavity 106 of non-permeable body 700. Non-permeable body 700 also is an example of non-permeable body 102 whose terminal surface 116 is chamfered such that the transitions between outer surface 110, terminal surface 116, and inner surface 108 have angles that are greater than 90°.

FIGS. 19-21 depict another example of non-permeable body 102, designated as non-permeable body 800. Non-permeable body 800 is yet another example of non-permeable body 102 whose internal cavity 106 is shaped to correspond to the shape of a particular fastener assembly. Non-permeable body 800 comprises external threads 802 for selective coupling with an upstream component of fastener-coating tool 100, such as second non-permeable-body part 142 or other structure configured to facilitate delivery of liquid 122 to internal cavity 106 of non-permeable body 800. Non-permeable body 800 also is an example of non-permeable body 102 whose terminal surface 116 is chamfered such that the transitions between outer surface 110, terminal surface 116, and inner surface 108 have angles that are greater than 90°.

FIGS. 22-24 depict yet another example of non-permeable body 102, designated as non-permeable body 900. Non-permeable body 900 also is an example of non-permeable body 102 whose internal cavity 106 is shaped to correspond to the shape of a particular fastener assembly. Non-permeable body 900 comprises external threads 902 for selective coupling with an upstream component of fastener-coating tool 100, such as second non-permeable-body part 142 or other structure configured to facilitate delivery of liquid 122 to internal cavity 106 of non-permeable body 900. Non-permeable body 900 also is an example of non-permeable body 102 whose terminal surface 116 is chamfered such that the transitions between outer surface 110, terminal surface 116, and inner surface 108 have angles that are greater than 90°.

Figure 25:
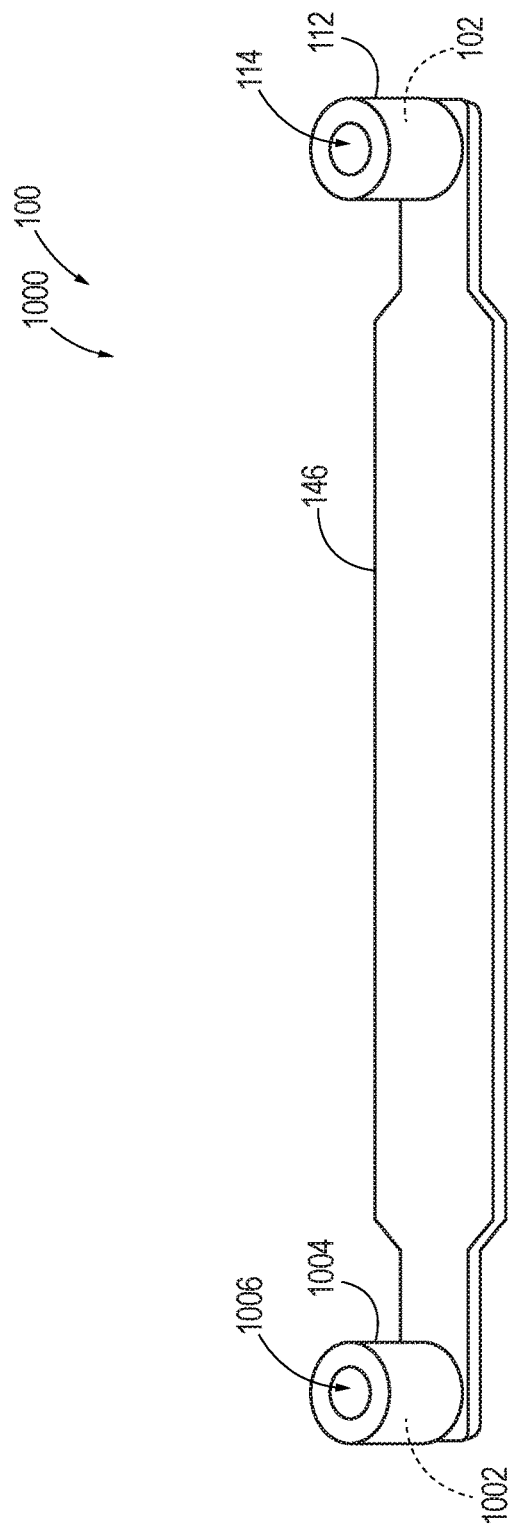
FIG. 25 is a perspective view of an example fastener-coating tool according to the present disclosure.

FIG. 25 depicts an example fastener-coating tool, designated as fastener-coating tool 1000. Fastener-coating tool 1000 is an example of fastener-coating tool 100 that comprises second non-permeable body 1002 and second permeable body 1004 that is coupled to second non-permeable body 1002, and handle 146 is coupled to and extends between non-permeable body 102 and second non-permeable body 1002. More specifically, handle 146 extends transverse to fastener cavities 114, 1006 of the two permeable bodies. In some examples of such a fastener-coating tool, second-permeable-body fastener cavity 1006 is identical in size and shape to fastener cavity 114 of permeable body 112. In other examples of such a fastener-coating tool, second-permeable-body fastener cavity 1006 is different in size and/or shape from fastener cavity 114 of permeable body 112.

Figure 26:
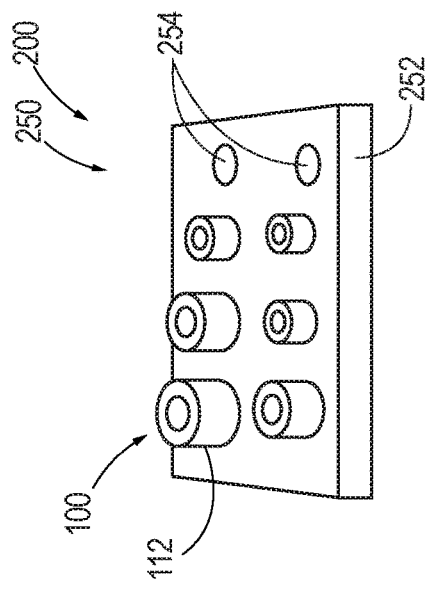
FIG. 26 is a perspective view of an example kit according to the present disclosure.

FIG. 26 depicts an example kit, designated as kit 250. Kit 250 comprises support plate 252 with a plurality of bores 254 configured to selectively retain and hold up to eight assemblies of non-permeable bodies and permeable bodies of different configurations. Accordingly, kit 250 may be positioned, for example, at a work station within a manufacturing environment where fastener assemblies 50 of various sizes and/or shapes need to be coated. A user of kit 250, therefore, may select a desired assembly from support plate 252 for use with a specific fastener assembly.

Figure 27:
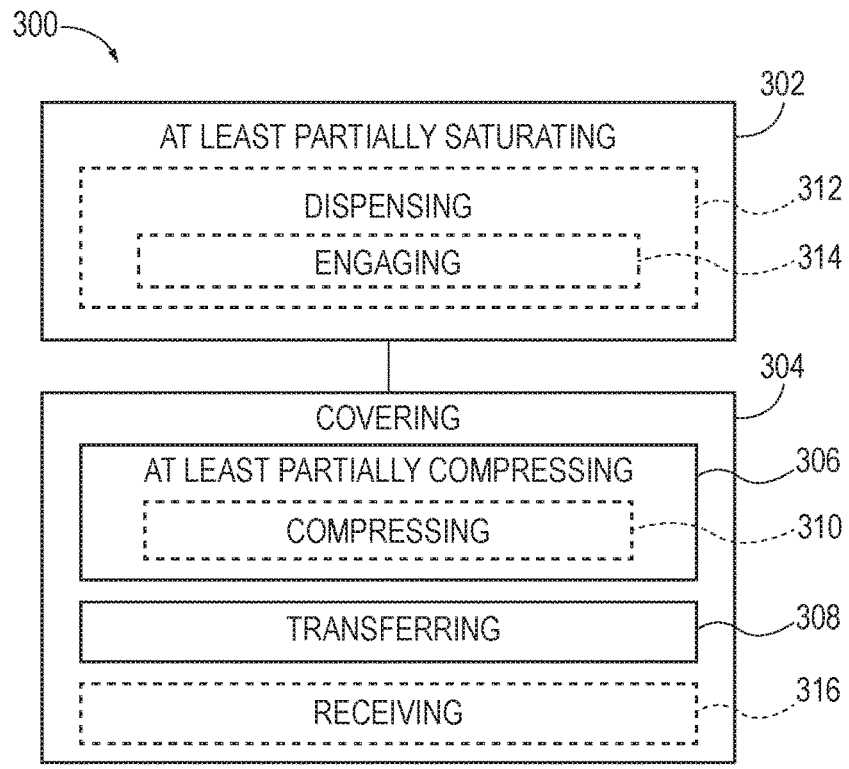
FIG. 27 is a flowchart schematically representing example methods according to the present disclosure.

FIG. 27 schematically provides a flowchart that represents illustrative, non-exclusive examples of methods 300 according to the present disclosure. In FIG. 27, some steps are illustrated in dashed boxes indicating that such steps may be optional or may correspond to an optional version of a method according to the present disclosure. That said, not all methods according to the present disclosure are required to include the steps illustrated in solid boxes. Moreover, steps presented in broken lines may be important to some implementations of methods 300. The methods and steps illustrated in FIG. 27 are not limiting and other methods and steps are within the scope of the present disclosure, including methods having greater than or fewer than the number of steps illustrated, as understood from the discussions herein. Although not required in all examples of methods 300, in some examples, method 300 is implemented using fastener-coating tool 100 according to the present disclosure or kit 200, according to the present disclosure.

As schematically represented in FIG. 27 and with reference to the example representations of fastener assembly 50 and fastener-coating tools 100 of FIGS. 1-7, methods 300 of coating fastener assembly 50 that extends from substrate 52 are disclosed. Methods 300 comprise steps of (block 302) at least partially saturating permeable body 112 with a volume of liquid 122, and (block 304) covering fastener assembly 50 with permeable body 112. The step of (block 304) covering fastener assembly 50 comprises steps of (block 306) at least partially compressing permeable body 112 against fastener assembly 50, and (block 308) transferring a portion of the volume of liquid 122 from permeable body 112 to exposed outer surface 54 of fastener assembly 50 and to ring 56 on substrate 52 that surrounds fastener assembly 50. Accordingly, implementation of method 300 results in application of liquid 122 to exposed outer surface 54 of the fastener assembly and to ring 56 on substrate 52, such as may correspond to a specification in the manufacture of a product.

According to some methods 300, as optionally represented in FIG. 27, the step of (block 306) at least partially compressing permeable body 112 comprises (block 310) compressing permeable body 112 between fastener assembly 50 and non-permeable body 102 and between substrate 52 and non-permeable body 102. Non-permeable body 102 serves as a rigid support for permeable body 112, and thus when non-permeable body 102 is urged toward substrate 52 and over fastener assembly 50, compression of permeable body 112 results in liquid 122 being transferred to fastener assembly 50 and substrate 52.

According to some methods 300, as optionally represented in FIG. 27, the step of (block 302) at least partially saturating permeable body 112 with the volume of liquid 122 comprises a step of (block 312) dispensing a predetermined volume of liquid 122 from liquid source 120. That is, a known quantity of liquid 122 is dispensed, such as to ensure an adequate coating of fastener assembly 50 and creation of ring 56, while also ensuring that an excessive amount of liquid 122 is not transferred. In some such methods 300, the optional step of (block 312) dispensing the predetermined volume of liquid 122 from liquid source 120 comprises a step of (block 314) engaging user-input mechanism 126. That is, operative engagement of user-input mechanism 126 results in the predetermined volume of liquid 122 being dispensed.

According to some methods 300, the step of (block 304) covering fastener assembly 50 with the permeable body optionally comprises a step of (block 316) receiving fastener assembly 50 within fastener cavity 114 of permeable body 112. For example, when fastener cavity 114 is sized and shaped to have an interference fit with fastener assembly 50, receipt of fastener assembly 50 within fastener cavity 114 will result in compression of permeable body 112, thereby resulting in the transfer of liquid 122 from permeable body 112 to exposed outer surface 54 of fastener assembly 50.

Figure 28:
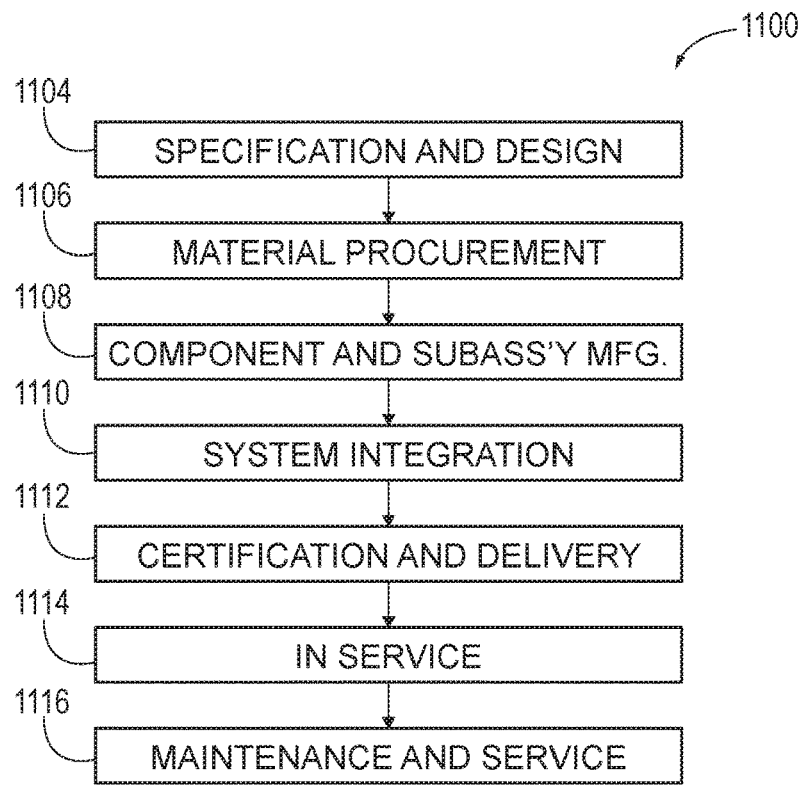
FIG. 28 is a block diagram of aircraft production and service methodology.
Figure 29:
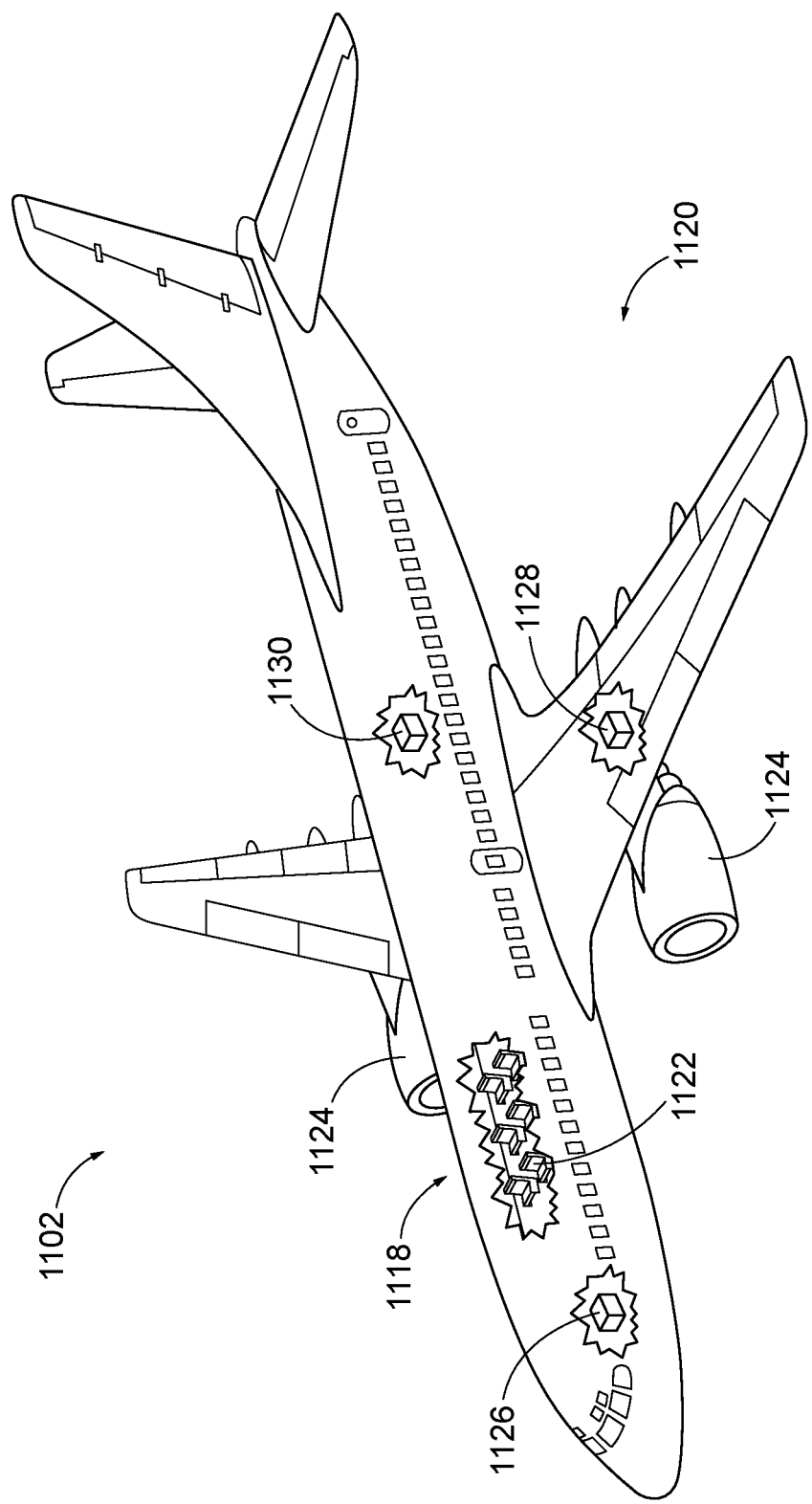
FIG. 29 is a schematic illustration of an aircraft.

Examples of the present disclosure may be described in the context of aircraft manufacturing and service method 1100 as shown in FIG. 28 and aircraft 1102 as shown in FIG. 29. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 29, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Illustrative, non-exclusive examples of inventive subject matter according to the present disclosure are described in the following enumerated paragraphs:

A1. A fastener-coating tool (100), comprising:
- a non-permeable body (102) that comprises a non-permeable wall (104), having a closed shape and comprising:
  - an inner surface (108) that defines an internal cavity (106) of the non-permeable body (102);
  - an outer surface (110) that faces away from the internal cavity (106) of the non-permeable body (102); and
  - a terminal surface (116), having a closed shape and interconnecting the inner surface (108) and the outer surface (110) of the non-permeable wall (104); and
- a permeable body (112) that:
  - laps over at least a portion of the outer surface (110) of the non-permeable wall (104);
  - laps over all of the terminal surface (116) of the non-permeable wall (104);
  - laps over at least a portion of the inner surface (108) of the non-permeable wall (104);
  - spans the internal cavity (106) of the non-permeable body (102); and
  - defines a fastener cavity (114) that extends at least partially within the internal cavity (106) of the non-permeable body (102) and that is sized and shaped to receive a portion of a fastener assembly (50) to be coated, and wherein the fastener cavity (114) has an open end (118), proximate to the terminal surface (116) of the non-permeable wall (104), and a closed end (119) within the internal cavity (106) of the non-permeable body (102) and opposite the open end (118).

A2. The fastener-coating tool (100) according to paragraph A1, wherein all portions of the permeable body (112) are fluidically permeable.

A3. The fastener-coating tool (100) according to paragraph A1 or A2, further comprising a liquid source (120), configured to deliver a liquid (122) to the internal cavity (106) of the non-permeable body (102).

A4. The fastener-coating tool (100) according to paragraph A3, wherein the liquid source (120) comprises a reservoir (124), configured to hold a volume of the liquid (122).

A5. The fastener-coating tool (100) according to paragraph A4, further comprising the volume of the liquid (122), and wherein the volume of the liquid (122) is held in the reservoir (124).

A6. The fastener-coating tool (100) according to any one of paragraphs A3 to A5, wherein the liquid (122) comprises at least one of a primer, a paint, or a liquid that has a viscosity of less than 100 centistokes.

A7. The fastener-coating tool (100) according to any one of A3 to A6, wherein the liquid source (120) comprises a user-input mechanism (126), configured to selectively dispense a predetermined volume of the liquid (122) from the liquid source (120) to the internal cavity (106) of the non-permeable body (102).

A8. The fastener-coating tool (100) according to any one of paragraphs A3 to A7, wherein:
- the non-permeable body (102) comprises a first non-permeable-body part (140) and a second non-permeable-body part (142), coupled to the first non-permeable-body part (140);
- the first non-permeable-body part (140) comprises the inner surface (108), the outer surface (110), and the terminal surface (116); and
- the second non-permeable-body part (142) comprises an inlet (144) to the internal cavity (106) of the non-permeable body (102) for receipt of the liquid (122) from the liquid source (120).

A9. The fastener-coating tool (100) according to paragraph A8, wherein the second non-permeable-body part (142) is releasably coupled to the first non-permeable-body part (140).

A10. The fastener-coating tool (100) according to any one of paragraphs A1 to A9, wherein the permeable body (112) is composed of a reticulated foam material (128).

A11. The fastener-coating tool (100) according to paragraph A10, wherein the reticulated foam material (128) has 50-100 pores per inch (127-254 pores per centimeter).

A12. The fastener-coating tool (100) according to any one of paragraphs A1 to A11, wherein the permeable body (112) consists of a single part.

A13. The fastener-coating tool (100) according to any one of paragraphs A1 to A11, wherein the permeable body (112) comprises a plurality of separate parts.

A14. The fastener-coating tool (100) according to any one of paragraphs A1 to A11, wherein:
- the permeable body (112) has a central axis (113);
- the permeable body (112) comprises a first permeable-body part (130) and a second permeable-body part (132), in contact with the first permeable-body part (130);
- the first permeable-body part (130) defines the open end (118) of the fastener cavity (114); and
- the second permeable-body part (132) defines the closed end (119) of the fastener cavity (114).

A15. The fastener-coating tool (100) according to paragraph A14, wherein the first permeable-body part (130) at least partially laps over the second permeable-body part (132) in a direction parallel to the central axis (113).

A16. The fastener-coating tool (100) according to paragraph A14 or A15, wherein the first permeable-body part (130) at least partially laps over the second permeable-body part (132) in a direction transverse to the central axis (113).

A17. The fastener-coating tool (100) according to paragraph A14 or A15, wherein the first permeable-body part (130) circumscribes the second permeable-body part (132) and does not lap over any portion of the second permeable-body part (132) when viewed along the central axis (113).

A18. The fastener-coating tool (100) according to paragraph A17, wherein the central axis (113) intersects the second permeable-body part (132) and does not intersect the first permeable-body part (130).

A19. The fastener-coating tool (100) according to paragraph A14 or A15, wherein the second permeable-body part (132) laps over the first permeable-body part (130) when viewed along the central axis (113).

A20. The fastener-coating tool (100) according to paragraph A19, wherein the central axis (113) intersects the second permeable-body part (132) and does not intersect the first permeable-body part (130).

A21. The fastener-coating tool (100) according to any one of paragraphs A14 to A20, wherein:
- the first permeable-body part (130) laps over at least a portion of the outer surface (110) of the non-permeable wall (104) of the non-permeable body (102);
- the first permeable-body part (130) laps over all of the terminal surface (116) of the non-permeable wall (104) of the non-permeable body (102); and
- the first permeable-body part (130) laps over at least a portion of the inner surface (108) of the non-permeable wall (104) of the non-permeable body (102).

A22. The fastener-coating tool (100) according to any one of paragraphs A1 to A21, wherein:
- the fastener cavity (114) of the permeable body (112) has a depth dimension (134), a first lateral dimension (136) at the open end (118) of the fastener cavity (114), and a second lateral dimension (138) at the closed end (119) of the fastener cavity (114);
- the first lateral dimension (136) is measured along an axis, perpendicular to an axis along which the depth dimension (134) is measured;
- the second lateral dimension (138) is measured along an axis, perpendicular to the axis along which the depth dimension (134) is measured; and
- the first lateral dimension (136) is greater than the second lateral dimension (138).

A23. The fastener-coating tool (100) according to paragraph A22, wherein:
- the permeable body (112) comprises a/the first permeable-body part (130) and a/the second permeable-body part (132), in contact with the first permeable-body part (130);
- the first permeable-body part (130) defines the open end (118) of the fastener cavity (114);
- the second permeable-body part (132) defines the closed end (119) of the fastener cavity (114); and
- the first permeable-body part (130) defines the first lateral dimension (136) and the second permeable-body part (132) defines the second lateral dimension (138).

A24. The fastener-coating tool (100) according to paragraph A22, wherein:
- the permeable body (112) comprises a first permeable-body part (130) and a second permeable-body part (132), in contact with the first permeable-body part (130);
- the first permeable-body part (130) defines the open end (118) of the fastener cavity (114);
- the second permeable-body part (132) defines the closed end (119) of the fastener cavity (114); and
- the first permeable-body part (130) defines the first lateral dimension (136) and the second lateral dimension (138).

A25. The fastener-coating tool (100) according to any one of paragraphs A1 to A24, wherein the internal cavity (106) of the non-permeable body (102) is wider proximate to the open end (118) of the fastener cavity (114) than proximate to the closed end (119) of the fastener cavity (114).

A26. The fastener-coating tool (100) according to any one of paragraphs A1 to A25, wherein the non-permeable body (102) consists of a single part.

A27. The fastener-coating tool (100) according to any one of paragraphs A1 to A25, wherein the non-permeable body (102) comprises more than one part.

A28. The fastener-coating tool (100) according to any one of paragraphs A1 to A27, further comprising a handle (146), coupled to the non-permeable body (102) and shaped to be grasped by a user for selective placement of the fastener cavity (114) over the fastener assembly (50).

A29. The fastener-coating tool (100) according to paragraph A28, wherein:
- the fastener-coating tool (100) further comprises a second non-permeable body (1002) and a second permeable body (1004), coupled to the second non-permeable body (1002); and
- the handle (146) is coupled to the non-permeable body (102) and the second non-permeable body (1002) and extends between the non-permeable body (102) and the second non-permeable body (1002).

A30. The fastener-coating tool (100) according to paragraph A29, wherein the second permeable body (1004) defines a second-permeable-body fastener cavity (1006) that is sized and shaped to receive either the portion of the fastener assembly (50) to be coated or a portion of a different fastener assembly to be coated.

A31. The fastener-coating tool (100) according to paragraph A30, wherein the second-permeable-body fastener cavity (1006) is identical in size and shape to the fastener cavity (114) of the permeable body (112).

A32. The fastener-coating tool (100) according to paragraph A30, wherein the second-permeable-body fastener cavity (1006) is different in size and/or shape from the fastener cavity (114) of the permeable body (112).

A33. The fastener-coating tool (100) according to any one of paragraphs A1 to A32, configured to perform the method (300) according to any one of paragraphs C1 to C12.

B1. A kit (200), comprising:
- two or more fastener-coating tools (100) according to any one of paragraphs A1 to A33.

B2. The kit (200) according to paragraph B1, wherein the fastener cavity (114) of one of the two or more fastener-coating tools (100) has a different size or shape than the fastener cavity (114) of another one of the two or more fastener-coating tools (100).

C1. A method (300) of coating a fastener assembly (50) that extends from a substrate (52), the method (300) comprising steps of:
- at least partially saturating a permeable body (112) with a volume of a liquid (122); and
- covering the fastener assembly (50) with the permeable body (112), wherein the step of covering the fastener assembly (50) comprises steps of:
  - at least partially compressing the permeable body (112) against the fastener assembly (50); and
  - transferring a portion of the volume of the liquid (122) from the permeable body (112) to an exposed outer surface (54) of the fastener assembly (50) and to a ring (56) on the substrate (52), surrounding the fastener assembly (50).

C2. The method (300) according to paragraph C1, wherein the step of at least partially compressing the permeable body (112) comprises compressing the permeable body (112) between the fastener assembly (50) and a non-permeable body (102) and between the substrate (52) and the non-permeable body (102).

C3. The method (300) according to paragraph C1 or C2, wherein the liquid (122) comprises at least one of a primer, a paint, or a liquid that has a viscosity of less than 100 centistokes.

C4. The method (300) according to any one of paragraphs C1 to C3, wherein the step of at least partially saturating the permeable body (112) with the volume of the liquid (122) comprises a step of dispensing a predetermined volume of the liquid (122) from a liquid source (120).

C5. The method (300) according to paragraph C4, wherein the step of dispensing the predetermined volume of the liquid (122) from the liquid source (120) comprises a step of engaging a user-input mechanism (126).

C6. The method (300) according to any one of paragraphs C1 to C5, wherein the permeable body (112) is composed of a reticulated foam material (128).

C7. The method (300) according to paragraph C6, wherein the reticulated foam material (128) has 50-100 pores per inch (127-254 pores per centimeter).

C8. The method (300) according to any one of paragraphs C1 to C7, wherein the permeable body (112) consists of a single part.

C9. The method (300) according to any one of paragraphs C1 to C7, wherein the permeable body (112) comprises a plurality of separate parts.

C10. The method (300) according to any one of paragraphs C1 to C9, wherein the step of covering the fastener assembly (50) with the permeable body comprises a step of receiving the fastener assembly (50) within a fastener cavity (114) of the permeable body (112).

C11. The method (300) according to paragraph C10, wherein the fastener cavity (114) is sized and shaped to have an interference fit with the fastener assembly (50).

C12. The method (300) according to any one of paragraphs C1 to C11, implemented using the fastener-coating tool (100) according to any one of paragraphs A1 to A33 or the kit (200) according to paragraph 131 or B2.

D1. The use of the fastener-coating tool (100) according to any one of paragraphs A1-A33 or the kit (200) according to paragraph 131 or B2 to coat with a/the liquid (122) a fastener assembly (50) and a ring (56) on a substrate (52), surrounding the fastener assembly (50).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A fastener-coating tool, comprising:
   a non-permeable body that comprises a non-permeable wall, having a closed shape and comprising:
   an inner surface that defines an internal cavity in the non-permeable body;
   an outer surface that faces away from the internal cavity of the non-permeable body; and
   a terminal surface, having a closed shape and interconnecting the inner surface and the outer surface of the non-permeable wall; and
   a permeable body that:
   laps over at least a portion of the outer surface of the non-permeable wall;
   laps over all of the terminal surface of the non-permeable wall;
   laps over at least a portion of the inner surface of the non-permeable wall;
   spans the internal cavity of the non-permeable body; and
   defines a fastener cavity that extends at least partially within the internal cavity of the non-permeable body and that is sized and shaped to receive a portion of a fastener assembly to be coated,
   wherein:
   the fastener cavity has an open end, proximate to the terminal surface of the non-permeable wall, and a closed end within the internal cavity of the non-permeable body and opposite the open end;
   the fastener cavity has a depth dimension, a first lateral dimension at the open end of the fastener cavity, and a second lateral dimension at the closed end of the fastener cavity;
   the first lateral dimension is measured along an axis, perpendicular to an axis along which the depth dimension is measured;
   the second lateral dimension is measured along an axis, perpendicular to the axis along which the depth dimension is measured; and
   the first lateral dimension is greater than the second lateral dimension.

2. The fastener-coating tool according to claim 1, further comprising a liquid source, configured to deliver a liquid to the internal cavity of the non-permeable body.

3. The fastener-coating tool according to claim 2, wherein:
the non-permeable body comprises a first non-permeable-body part and a second non-permeable-body part, coupled to the first non-permeable-body part;
the first non-permeable-body part comprises the inner surface, the outer surface, and the terminal surface; and
the second non-permeable-body part comprises an inlet to the internal cavity of the non-permeable body for receipt of the liquid from the liquid source.

4. The fastener-coating tool according to claim 1, wherein:
the permeable body has a central axis;
the permeable body comprises a first permeable-body part and a second permeable-body part, distinct from and in contact with the first permeable-body part;
the first permeable-body part defines the open end of the fastener cavity; and
the second permeable-body part defines the closed end of the fastener cavity.

5. The fastener-coating tool according to claim 4, wherein the first permeable-body part at least partially laps over the second permeable-body part in a direction parallel to the central axis.

6. The fastener-coating tool according to claim 4, wherein the first permeable-body part at least partially laps over the second permeable-body part in a direction transverse to the central axis.

7. The fastener-coating tool according to claim 4, wherein the first permeable-body part circumscribes the second permeable-body part and does not lap over any portion of the second permeable-body part when viewed along the central axis.

8. The fastener-coating tool according to claim 7, wherein the central axis intersects the second permeable-body part and does not intersect the first permeable-body part.

9. The fastener-coating tool according to claim 4, wherein the second permeable-body part laps over the first permeable-body part when viewed along the central axis.

10. The fastener-coating tool according to claim 9, wherein the central axis intersects the second permeable-body part and does not intersect the first permeable-body part.

11. The fastener-coating tool according to claim 4, wherein:
the first permeable-body part laps over at least a portion of the outer surface of the non-permeable wall of the non-permeable body;
the first permeable-body part laps over all of the terminal surface of the non-permeable wall of the non-permeable body; and
the first permeable-body part laps over at least a portion of the inner surface of the non-permeable wall of the non-permeable body.

12. The fastener-coating tool according to claim 1, wherein:
the permeable body comprises a first permeable-body part and a second permeable-body part, in contact with the first permeable-body part;
the first permeable-body part defines the open end of the fastener cavity;
the second permeable-body part defines the closed end of the fastener cavity; and
the first permeable-body part defines the first lateral dimension and the second permeable-body part defines the second lateral dimension.

13. The fastener-coating tool according to claim 1, wherein:
the permeable body comprises a first permeable-body part and a second permeable-body part, in contact with the first permeable-body part;
the first permeable-body part defines the open end of the fastener cavity;
the second permeable-body part defines the closed end of the fastener cavity; and
the first permeable-body part defines the first lateral dimension and the second lateral dimension.

14. The fastener-coating tool according to claim 1, wherein the non-permeable body consists of a single part.

15. The fastener-coating tool according to claim 1, wherein the non-permeable body comprises more than one part.

16. The fastener-coating tool according to claim 1, further comprising a handle, coupled to the non-permeable body and shaped to be grasped by a user for selective placement of the fastener cavity over the fastener assembly.

17. The fastener-coating tool according to claim 16, wherein:
the fastener-coating tool further comprises a second non-permeable body and a second permeable body, coupled to the second non-permeable body; and
the handle is coupled to the non-permeable body and the second non-permeable body and extends between the non-permeable body and the second non-permeable body.

18. The fastener-coating tool according to claim 17, wherein the second permeable body defines a second-permeable-body fastener cavity that is sized and shaped to receive either the portion of the fastener assembly to be coated or a portion of a different fastener assembly to be coated.

19. A fastener-coating tool, comprising:
a non-permeable body that comprises a non-permeable wall, having a closed shape and comprising:
an inner surface that defines an internal cavity in the non-permeable body;
an outer surface that faces away from the internal cavity of the non-permeable body; and
a terminal surface, having a closed shape and interconnecting the inner surface and the outer surface of the non-permeable wall; and
a permeable body that:
laps over at least a portion of the outer surface of the non-permeable wall;
laps over all of the terminal surface of the non-permeable wall;
laps over at least a portion of the inner surface of the non-permeable wall;
spans the internal cavity of the non-permeable body; and
defines a fastener cavity that extends at least partially within the internal cavity of the non-permeable body and that is sized and shaped to receive a portion of a fastener assembly to be coated,
wherein:
the fastener cavity has an open end, proximate to the terminal surface of the non-permeable wall, and a closed end within the internal cavity of the non-permeable body and opposite the open end;
the permeable body has a central axis;
the permeable body comprises a first permeable-body part and a second permeable-body part, distinct from and in contact with the first permeable-body part;

the first permeable-body part defines the open end of the fastener cavity;

the second permeable-body part defines the closed end of the fastener cavity;

the first permeable-body part laps over at least a portion of the outer surface of the non-permeable wall of the non-permeable body;

the first permeable-body part laps over all of the terminal surface of the non-permeable wall of the non-permeable body; and the first permeable-body part laps over at least a portion of the inner surface of the non-permeable wall of the non-permeable body.

20. A fastener-coating tool, comprising:

a non-permeable body that comprises a non-permeable wall, having a closed shape and comprising:

an inner surface that defines an internal cavity in the non-permeable body;

an outer surface that faces away from the internal cavity of the non-permeable body; and a terminal surface, having a closed shape and interconnecting the inner surface and the outer surface of the non-permeable wall;

a permeable body that:

laps over at least a portion of the outer surface of the non-permeable wall;

laps over all of the terminal surface of the non-permeable wall;

laps over at least a portion of the inner surface of the non-permeable wall;

spans the internal cavity of the non-permeable body; and defines a fastener cavity that extends at least partially within the internal cavity of the non-permeable body and that is sized and shaped to receive a portion of a fastener assembly to be coated, and wherein the fastener cavity has an open end, proximate to the terminal surface of the non-permeable wall, and a closed end within the internal cavity of the non-permeable body and opposite the open end; and a handle, coupled to the non-permeable body and shaped to be grasped by a user for selective placement of the fastener cavity over the fastener assembly, wherein:

the fastener-coating tool further comprises a second non-permeable body and a second permeable body, coupled to the second non-permeable body; and the handle is coupled to the non-permeable body and the second non-permeable body and extends between the non-permeable body and the second non-permeable body.

* * * * *